United States Patent [19]

Evans et al.

[11] Patent Number: 4,609,712

[45] Date of Patent: Sep. 2, 1986

[54] METHOD FOR PREPARING MONOMERIC AND POLYMERIC BIS(DICARBOXYPHENYL) SULFONE COMPOUNDS

[75] Inventors: Thomas L. Evans; Marsha M. Grade, both of Schenectady, N.Y.

[73] Assignee: General Electric Company, Schenectady, N.Y.

[21] Appl. No.: 621,822

[22] Filed: Jun. 18, 1984

[51] Int. Cl.$^4$ ............................................... C08G 73/10
[52] U.S. Cl. ..................................... 525/417; 525/436; 528/172; 528/352; 528/353; 562/429; 562/432; 568/27
[58] Field of Search ............... 562/429, 432; 568/27; 528/172, 352, 353; 525/417, 436

[56] References Cited

U.S. PATENT DOCUMENTS

| | | | |
|---|---|---|---|
| 3,022,320 | 2/1962 | Bennett et al. | 562/429 |
| 3,529,017 | 9/1970 | Izard et al. | 562/432 |
| 3,622,525 | 11/1971 | Miller | 562/429 |
| 3,812,159 | 5/1974 | Lubowitz | 562/429 |
| 3,878,240 | 4/1975 | Kuenzy | 562/429 |
| 4,275,240 | 6/1981 | Yamaguchi et al. | 562/429 |
| 4,287,366 | 9/1981 | Yamaguchi et al. | 562/429 |
| 4,329,496 | 5/1982 | Webb | 562/429 |

*Primary Examiner*—Lester L. Lee
*Attorney, Agent, or Firm*—William H. Pittman; James C. Davis, Jr.; James Magee, Jr.

[57] ABSTRACT

Bis(dicarboxyphenyl) sulfone compounds, including the free tetracarboxylic acids and their functional derivatives such as salts, esters, amides, anhydrides and imides, are prepared by oxidizing the corresponding sulfides with a relatively strong oxidizing agent, preferably a peroxy reagent such as acetyl peroxide or m-chloroperbenzoic acid. The reaction is especially useful for the preparation of sulfone polyimides, since films of the sulfide polyimides may be oxidized without dissolving or otherwise degrading their structural integrity.

16 Claims, 2 Drawing Figures

FIG. I
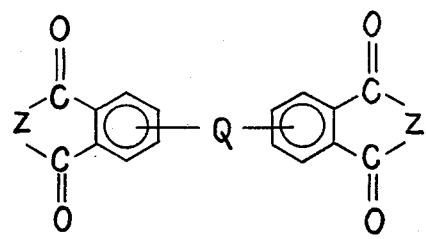
FIG. II
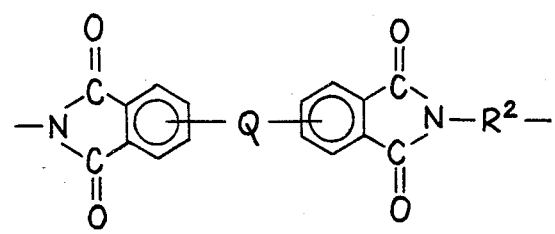

METHOD FOR PREPARING MONOMERIC AND POLYMERIC BIS(DICARBOXYPHENYL) SULFONE COMPOUNDS

This invention relates to the conversion of aromatic sulfides to sulfones, and to a convenient method for said conversion which is applicable both to polymers and to their monomeric precursors.

Polyimides derived from aromatic tetracarboxylic acids containing sulfone groups are known to have a number of advantageous properties such as solvent resistance and high thermal stability. Reference is made, for example, to U.S. Pat. Nos. 3,422,064 and 4,429,102, which disclose polyimides derived from bis(dicarboxyphenyl)sulfone dianhydrides. The disclosures of both of these patents are incorporated by reference herein.

As noted in the latter patent, bis(3,4-dicarboxyphenyl)sulfone dianhydride may be obtained by sulfonating o-xylene to the corresponding sulfone, oxidizing the methyl groups of the sulfone to carboxy groups and forming the anhydride of the resulting tetracarboxylic acid. This is, however, a relatively cumbersome procedure.

A principal object of the present invention, therefore, is to provide a relatively simple method for the preparation of bis(dicarboxyphenyl)sulfone compounds and polymers derived therefrom.

A further object is to provide such a method which is relatively simple and involves a minimum of reaction and processing steps.

A still further object is to provide such a method which is adaptable to preparation of monomeric compounds and also of polymers.

Other objects will in part be obvious and will in part appear hereinafter.

In its broadest sense, the present invention is a method for preparing a bis(dicarboxyphenyl)sulfone compound which comprises oxidizing the corresponding sulfide compound with a relatively strong oxidizing agent.

The bis(dicarboxyphenyl)sulfide compounds which are converted to sulfones in accordance with this invention are the free tetracarboxylic acids and their functional derivatives, including salts, amides, esters, anhydrides and imides. The esters are usually lower alkyl (i.e., alkyl of up to 7 carbon atoms) esters, and the amides may also be $N_f$-(lower alkyl) or N,N-di-(lower alkyl) amides.

Most often, however, the sulfide is either a compound having the formula in FIG. I, wherein Q is sulfur, Z is O or $NR^1$ and $R^1$ is hydrogen, lower alkyl or an electron-deficient radical; or a polymer containing structural units having the formula in FIG. II, wherein Q is sulfur and $R^2$ is a divalent hydrocarbon-based radical. Reference is made, for example, to U.S. Pat. No. 3,983,093, which discloses bis(2,3-dicarboxyphenyl)sulfide dianhydride and also the 3,4-dicarboxy isomer, as well as polyimides derived therefrom, and whose disclosure is incorporated by reference herein. The 3,4-dicarboxy compounds are preferred. The corresponding monomeric bisimides may be obtained from the dianhydrides by known methods. For the sake of brevity, the bis(3,4-dicarboxyphenyl)sulfide and sulfone and their dianhydrides and bis-N-methylimides will hereinafter be designated "sulfide tetraacid", "sulfide dianhydride", "sulfide bisimide", "sulfone dianhydride", etc., as appropriate.

The Z value in the sulfide compounds having the formula in FIG. I may be oxygen, whereupon the compound is a dianhydride, or $NR^1$, whereupon it is a bisimide. When it is the latter, $R^1$ may be hydrogen or lower alkyl. The preferred $R^1$ radicals are primary lower alkyl radicals and especially those containing up to 4 carbon atoms. Especially preferred is the methyl radical.

The $R^1$ value may also be an electron-deficient radical. For the most part, suitable radicals of this type comprise aromatic hydrocarbon radicals containing one or more strongly electron-withdrawing substituents and heterocyclic radicals having aromatic character. Reference is made to copending, commonly assigned application Ser. No. 505,636, filed June 20, 1983, the disclosure of which is also incorporated by reference herein.

Suitable aromatic hydrocarbon radicals include phenyl, naphthyl and the like containing such substituents as halo, nitro, keto, carbalkoxy, cyano and perfluoroalkyl. At least one of said substituents is preferably ortho or para to the free valence bond (i.e., the one attached to the imide nitrogen atom). The trifluoromethylphenyl radicals are particularly preferred within this subgenus.

Suitable heterocyclic radicals having aromatic character include those with 5- or 6-membered rings and aromatic unsaturation of the type existing in pyrrole and pyridine. These radicals preferably contain 1-3 and especially 1 or 2 hetero atoms of which at least one is nitrogen and the others, if present, are nitrogen or sulfur. They are usually unsubstituted but may be substituted, especially with electron-withdrawing substituents such as those previously enumerated. The free valence bond is preferably in the 2- or 4-position with respect to a hetero atom. If the ring contains more than one hetero atom and especially if it is 5-membered, the free valence bond is preferably attached to the single carbon atom between two of said hetero atoms.

Illustrative 5-membered heterocyclic radicals are pyrrolyl, 2-thiazolyl, 2-imidazolyl and 2-(1,3,4-thiadiazolyl). Illustrative 6-membered radicals are 2-pyridyl, 3-pyridyl, 4-pyridyl, 2-pyrimidyl, 2-pyrazyl, 2-(1,4-thiazolyl) and 2-(1,3-thiazolyl). Particularly preferred within this subgenus are the aminopyridyl radicals, especially 2-pyridyl and 4-pyridyl.

The sulfide polymers having structural units with the formula in FIG. II which are useful in the present invention generally include all polyimides in which such units are present. Illustrative are the copolyimides disclosed in the aforementioned U.S. Pat. No. 3,983,093, which contain sulfide imide in combinations with ether imide moieties and which are often preferred. The $R^2$ values therein are divalent hydrocarbon-based radicals; this term includes hydrocarbon radicals as well as substituted and hetero radicals wherein the substituents or hetero atoms do not have a deleterious effect on the properties of the polymer. Most often, $R^2$ is an aromatic hydrocarbon radical containing about 6-20 carbon atoms or a halogenated derivative thereof, an alkylene or cycloalkylene radical containing about 2-20 carbon atoms, or a bis-alkylenepoly(dialkylsiloxane) radical. The aromatic hydrocarbon radicals are preferred, and especially the m-phenylene, 4,4'-bis(phenylene)methane and 4,4'-bis(phenylene)ether radicals.

The oxidizing agent used to oxidize the sulfide to the corresponding sulfone may be any of several relatively strong oxidizers. These include, for example, nitric acid, ozone, potassium permanganate, chromic acid, sodium dichromate, ruthenium tetroxide, selenium dioxide, iodobenzene dichloride and sodium hypochlorite. The preferred oxidizing agents are peroxy reagents, including hydrogen peroxide, organic peroxides such as acetyl peroxide and benzoyl peroxide, organic peracids such as perbenzoic acid and m-chloroperbenzoic acid, and organic hydroperoxides in the presence of transition metal compounds such as molybdovanadic acid. Especially preferred are acetyl peroxide (which may be formed in situ, for example, from acetic anhydride and hydrogen peroxide) and m-chloroperbenzoic acid.

The choice of the oxidizing agent may be governed to some extent by the molecular structure of the sulfone product. For example, sulfone dianhydride is easily hydrolyzed to the corresponding tetracarboxylic acid, which is readily soluble in water. Thus, the use of an aqueous reagent such as acetyl peroxide for oxidation of the corresponding sulfide may make recovery of the product somewhat difficult, since it may require isolation of the tetracarboxylic acid from water and its reconversion to the dianhydride. Reactions of the same type frequently occur with bisimides containing electron-deficient N-substituents. When sulfides containing these groups are to be oxidized, therefore, the use of a non-aqueous system and an organophilic peroxy reagent such as m-chloroperbenzoic acid is frequently preferred.

The method of this invention is ordinarily conducted by merely heating a mixture of the sulfide and the oxidizing agent (optionally with gradual or incremental addition of the latter) at a temperature within the range of about 35°-150° C., preferably about 40°-110° C., until oxidation to the sulfone is complete. The reaction is usually conducted in a substantially inert diluent. Depending on the identities of the reactants, it may be a substantially polar diluent such as water or dimethylformamide or a relatively non-polar material such as methylene chloride, chloroform, toluene or petroleum naphtha. The diluent need not be a solvent for the sulfide or sulfone and frequently is not, especially when the reactant and product are polymers.

The amount of oxidizing agent used should usually be sufficient to effect complete oxidation of the sulfide. This generally involves the use of an excess thereof. The precise amount of the excess is not critical, since any oxidizing agent remaining after oxidation is complete may be removed by washing with a suitable solvent or by treatment with a mild reducing agent such as a sulfite. In general, the ratio of equivalents of oxidizing agent to sulfide may be about 5-15:1 in the case of a monomeric sulfide and up to about 200:1 in the case of a polymeric sulfide. For the purposes of this invention, the equivalent weight of a non-polymeric reagent is its molecular weight divided by the number of electrons per molecule liberated or consumed in the oxidation-reduction reaction. Thus, the equivalent weight of a monosulfide is one quarter of its molecular weight and that of a monoperoxy reagent is half its molecular weight. The equivalent weight of a sulfide-containing polymer is that of one of the sulfide-containing structural units weighted according to the percentage of such units in the polymer.

Following the oxidation reaction, the sulfone product (having the formula in FIG. I or II wherein Q is $SO_2$) may be recovered by known methods which may include such conventional steps as solvent stripping, product precipitation and/or recrystallization. When used with polymeric materials, especially in the form of films, the method of this invention is particularly advantageous since oxidation may be effected without dissolving or otherwise degrading the structural integrity of the polymer. Thus, the polymer film may be treated with an aqueous or organic solution of an appropriate oxidizing agent and oxidized without dissolving or substantially swelling the film. This permits preparation of the sulfone polyimide by a relatively simple method comprising the steps of sulfide polyimide formation and oxidation, without the need for complex or difficult isolation or purification operations.

The method of this invention is illustrated by the following examples.

EXAMPLE 1

A solution of 5 grams (61.2 milliequivalents) of sulfide dianhydride and 72 ml. (765 millimoles) of acetic anhydride in 27 ml. of water was heated at 80°-85° C. until homogeneous. It was then heated to reflux and 25 ml. (490 milliequivalents) of 30% aqueous hydrogen peroxide was added over 20 minutes. Refluxing was continued for 2 hours, after which the solution was cooled to room temperature and the remaining peroxide was reduced by the gradual addition of a 30% aqueous solution of 1.25 equivalents of sodium metabisulfite. Upon evaporation of the water, a solid mixture was obtained which was extracted with ether; stripping of the ether yielded an organic product which comprised principally sulfone tetraacid.

The acid was heated in o-dichlorobenzene with acetic anhydride in a 4:1 molar ratio for several hours and the mixture was cooled and filtered. The filtration residue was recrystallized from o-dichlorobenzene, yielding the desired sulfone dianhydride in the form of off-white crystals having a melting point of 274° C. The product was identified by its infrared and $C^{13}$ nuclear magnetic resonance spectra and by mass spectrometry.

EXAMPLE 2

A solution of 5 grams (56.8 milliequivalents) of sulfide bisimide and 67 ml. (710 millimoles) of acetic anhydride in 25 ml. of water was heated under reflux and 23 ml. (408 milliequivalents) of 30% aqueous hydrogen peroxide was added over 20 minutes. Refluxing was continued for 2 hours after which the mixture was cooled to room temperature. The solid which separated was removed by filtration, washed with a dilute aqueous sodium metabisulfite solution and with water, and dried to yield the desired sulfone bisimide having a melting point of 288° C., which was identified as described in Example 1.

EXAMPLE 3

A polythioetherimide was prepared by reacting sulfide dianhydride with an equimolar amount of bis(4-aminophenyl)ether in dimethylacetamide solution to form the polyamic acid, followed by casting a film of said polyamic acid and heating to form the polyimide film which had a glass transition temperature of 255° C. A 75-mg. sample of the polythioetherimide film was suspended in 17 ml. of acetic anhydride, the mixture was heated to 85° C. and 6 ml. of 30% aqueous hydrogen peroxide was added dropwise. The mixture was heated under reflux for 18 hours, after which the film was removed, washed with water and dried under nitrogen for 18 hours at 210° C. The glass transition temperature of the product was 318° C. Examination of the starting material and product by Fourier transform infrared spectroscopy showed the conversion of the sulfide to sulfone moieties.

EXAMPLE 4

A 10-mg. sample of the polythioetherimide film of Example 3 was suspended for 16 hours in a solution of 0.45 gram of m-chloroperbenzoic acid in 25 ml. of methylene chloride. The film was then removed from the solution, washed several times with methylene chloride and dried under nitrogen for 18 hours at 220° C. The product was a film of the desired sulfone polyimide. It had a glass transition temperature of 313° C., as compared with 315° C. for an authentic polyimide sample prepared by the reaction of the same diamine with sulfone dianhydride.

What is claimed is:

1. A method for preparing a bis(dicarboxyphenyl)sulfone compound which comprises oxidizing the corresponding sulfide compound with an oxidizing agent selected from the group consisting of acetyl peroxide and m-chloroperbenzoic acid, employed in excess at a temperature within the range of about 35°–150° C.

2. A method according to claim 1 wherein the bis(-dicarboxyphenyl)sulfone compound is the free tetracarboxylic acid or a salt, amide, ester, anhydride or imide thereof.

3. A method according to claim 2 wherein the bis(-dicarboxyphenyl)sulfone compound has the formula

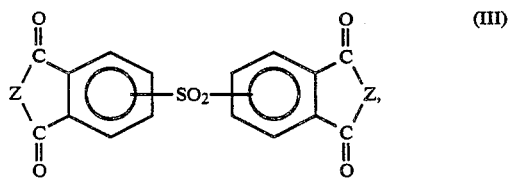
(III)

wherein Z is O or NR$^1$ and R$^1$ is hydrogen, lower alkyl or an electron-deficient radical, or is a polymer containing structural units having the formula

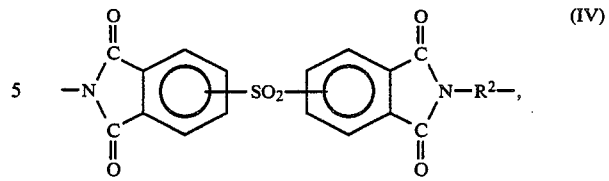
(IV)

wherein R$^2$ is a divalent hydrocarbon-based radical.

4. A method according to claim 3 wherein the bis(-dicarboxyphenyl)sulfone compound is a bis(3,4-dicarboxyphenyl)sulfone compound.

5. A method according to claim 3 wherein the bis(-dicarboxyphenyl)sulfone compound is a polymer having structural units of formula IV.

6. A method according to claim 5 wherein R$^2$ is an aromatic hydrocarbon radical containing about 6–20 carbon atoms or an halogenated derivative thereof, an alkylene or cycloalkylene radical containing about 2–20 carbon atoms, or a bis-alkylenepoly(dialkylsiloxane) radical.

7. A method according to claim 6 wherein R$^2$ is the m-phenylene, 4,4'-bis(phenylene)methane or 4,4'-bis(-phenylene)ether radical.

8. A method according to claim 7 wherein the sulfone polymer is a bis(3,4-dicarboxyphenyl)sulfone polyimide.

9. A method according to claim 8 wherein the peroxy reagent is acetyl peroxide.

10. A method according to claim 9 wherein the acetyl peroxide is formed in situ from acetic anhydride and hydrogen peroxide.

11. A method according to claim 8 wherein the peroxy reagent is m-chloroperbenzoic acid.

12. A method for preparing a sulfone polyimide having structural units of the formula

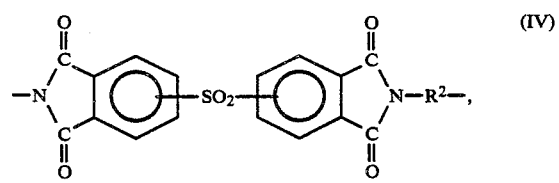
(IV)

wherein R$^2$ is a divalent hydrocarbon-based radical, which comprises oxidizing the corresponding sulfide polyimide with a relatively strong oxidizing agent.

13. A method according to claim 12 wherein the polyimide is in the form of a film which is oxidized without dissolution or substantial swelling.

14. A method according to claim 13 wherein R$^2$ is an aromatic hydrocarbon radical containing about 6–20 carbon atoms or an halogenated derivative thereof, an alkylene or cycloalkylene radical containing about 2–20 carbon atoms, or a bis-alkylenepoly(dialkylsiloxane) radical.

15. A method according to claim 14 wherein R$^2$ is the m-phenylene, 4,4'-bis(phenylene)methane or 4,4'-bis(-phenylene)ether radical.

16. A method according to claim 15 wherein the sulfone polymer is a bis(3,4-dicarboxyphenyl)sulfone polyimide.

* * * * *